March 25, 1958
O. F. TRIPPLER
2,827,694
HAND-OPERATED CAM ACTUATED PIVOTED JAW TOOL
Filed Jan. 7, 1955
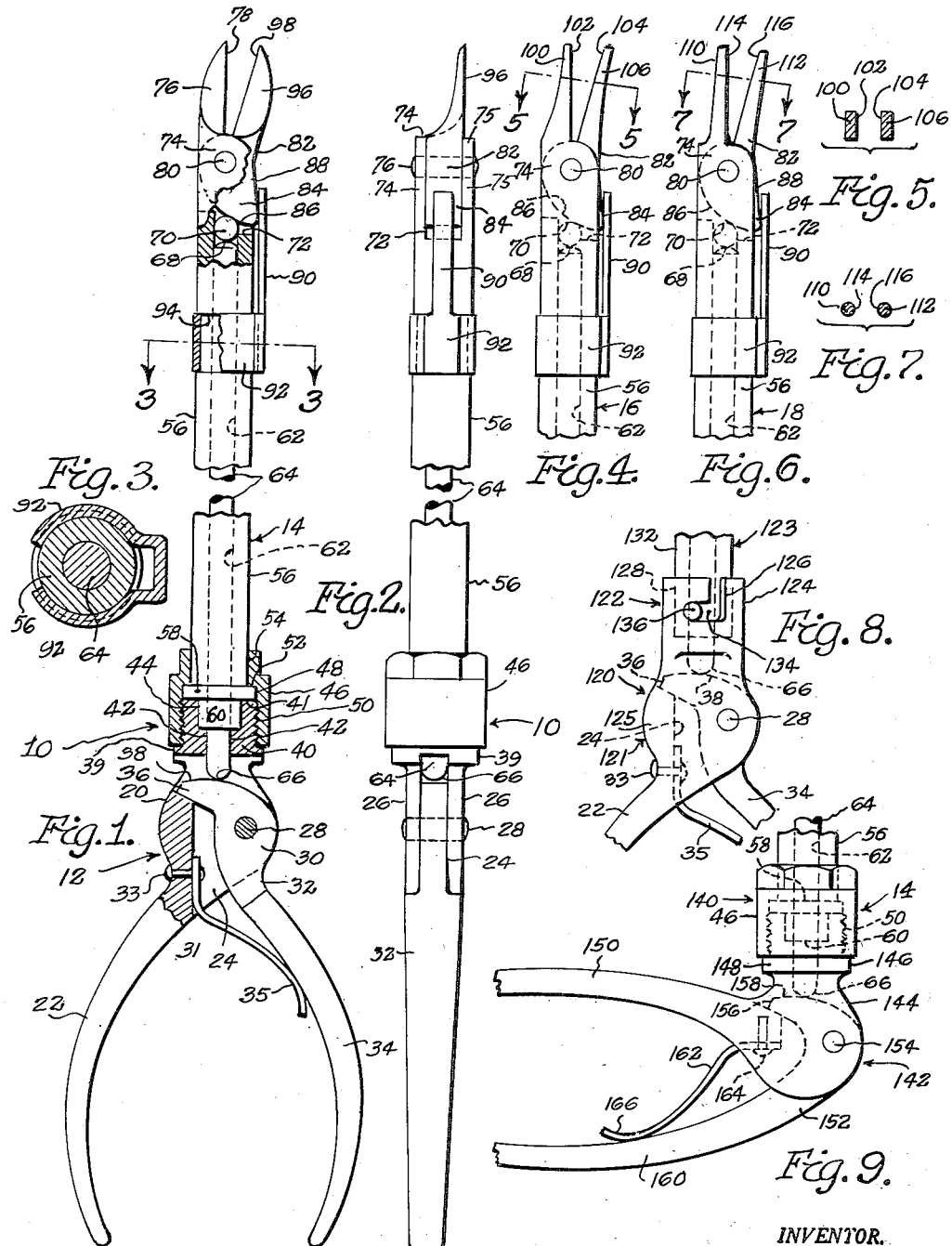
INVENTOR.
Otto F. Trippler
BY Barthel & Bugbee
Attys

United States Patent Office 2,827,694
Patented Mar. 25, 1958

2,827,694

HAND-OPERATED CAM ACTUATED PIVOTED JAW TOOL

Otto F. Trippler, East Detroit, Mich.

Application January 7, 1955, Serial No. 480,353

1 Claim. (Cl. 30—188)

This invention relates to hand tools and, in particular, to hand-operated gripping and cutting tools.

One object of this invention is to provide a hand-operated tool adapted to be used to perform work, such as gripping or cutting, in inaccessible locations and having working jaws disposed at a considerable distance from an operating handle and constructed and arranged in such a way that when the handle is swung to and fro, one of the jaws moves toward or away from the other to perform a working stroke, such as to cut or grip an object.

Another object is to provide a hand-operated tool of the foregoing character wherein the swinging of a handle reciprocates an elongated motion-transmitting member which in turn actuates a working jaw pivoted to a cooperating jaw to grip or cut material placed therebetween.

Other objects and advantages of the invention will become apparent during the course of the following description of the accompanying drawings, wherein:

Figure 1 is a front elevation, partly in section, of a universal hand tool, according to one form of the invention, with a cutting unit fitted into the handle unit;

Figure 2 is a right-hand side elevation of the tool shown in Figure 1;

Figure 3 is a cross-section taken along the line 3—3 in Figure 1;

Figure 4 is a fragmentary front elevation of a flat-nosed plier unit interchangeable with the cutting unit in the handle unit of Figure 1;

Figure 5 is a cross-section taken along the line 5—5 in Figure 4;

Figure 6 is a fragmentary front elevation of a round-nosed plier unit interchangeable with the flat-nosed plier unit of Figure 4 and the cutting unit of Figure 1;

Figure 7 is a cross-section along the line 7—7 in Figure 6;

Figure 8 is a fragmentary front elevation of a modification of the invention having a bayonet joint between the tool and handle units; and Figure 9 is a fragmentary front elevation of a modified handle unit adapted for use with the tool units of Figures 1 to 7 inclusive.

Referring to the drawings in detail, Figure 1 shows a universal hand-operated gripping or cutting tool, generally designated 10, consisting generally of a handle unit 12 in which tool units 14 (Figure 1), 16 (Figure 4) and 18 (Figure 6) are interchangeably mounted. The tool units 14, 16 and 18 have different operating ends adapted to perform different operations on work for different purposes, or for different shapes of work.

The handle unit 12 consists of a central fulcrum supporting body or hub 20 having an arcuate stationary handle 22 integral therewith or fixedly secured thereto. The hub 20 is provided with a cutaway portion or slot 24 having spaced opposite side walls or arms 26 (Figure 2) drilled for the reception of a pivot pin 28 upon which the hub portion 30 of an arcuate movable handle lever 32 is pivotally mounted. A leaf spring 31 pinned or otherwise secured as at 33 to the body 20 within the slot 24 has an arcuate spring portion 35 projecting rearwardly therefrom. The handle lever 32 has an arcuate portion 34 engageable by the spring portion 35 and projecting in a rearward direction from its hub 30 and a cam portion 36 projecting forwardly from the hub 30. The cam portion 36 has an arcuate cam surface or edge 38 thereon adapted to engage the working parts of one of the tool units 14, 16 or 18 as explained below. The body 20 forward of the slot 24 is provided with a flange 39 and a stationary threaded coupling portion 40 having a forward end 41 and also having a central bore 42 and counterbore 44 therein.

Each tool unit 14, 16 or 18 is provided with a stepped internally-threaded coupling collar 46 adapted to be threaded upon the stationary threaded coupling portion 40 and having a counterbore 48 with a threaded portion 50 at the mouth thereof. Extending into the counterbore 48 of the coupling collar 46 and forming an annular shoulder 52 therewith is a bore 54. Mounted in the bore 54 is an elongated tubular stem 56 having a flange 58 seated in the counterbore 48 against the annular shoulder 52 therebetween, with the rearward side of the flange engaging the forward end 41 of the threaded coupling portion 40. The stem 56 is also provided with a reduced diameter portion 60 which fits snugly but removably into the counterbore 44.

The stem 56 and its reduced diameter portion 60 are provided with an elongated bore 62 extending from end to end thereof. Mounted in the bore 62 is a motion-transmitting rod 62 having a rounded rearward end 66 engageable with the cam edge 38 of the handle lever 32 and having at its forward end a similarly-rounded portion 68 engageable with a contact ball 70 also mounted in the bore 62. The contact ball 70 projects into a slot 72 in the forward end of the stem 56, the side walls 74 and 75 of which form laterally-spaced arms. The arm 74 has a fixed extension jaw 76 extending forwardly therefrom and provided with a cutting edge 78.

The arms 74 are bored to receive a pivot pin 80 upon which is pivotally mounted a movable jaw lever 82 bored centrally to receive the pivot pin 80. The movable jaw lever 82 at its rearward end 84 is provided with an arcuate cam surface or edge 86 engageable with the contact ball 70, and a spring engagement edge 88 engaged by the forward end of a leaf spring 90, the rearward end of which has a pair of arcuate gripping arms 92 (Figure 3) engaging an annular reduced diameter portion or groove 94 in the stem 56. The movable jaw lever 82 is provided with a forward end or arm 96 with a cutting edge 98 thereon facing the cutting edge 78 and coacting therewith to cut or shear articles placed therebetween.

The tool unit 16 is of similar construction to the tool unit 14 in all respects except at its forward end, hence similar parts are designated with the same reference numerals. At its forward end, the tool unit 16 is provided with a flat fixed jaw 100 extending forwardly from the arm 74. The jaw 100 is provided with a flat inner face or work-engaging face 102 engageable with a correspondingly-shaped face 104 on the jaw 106 extending forwardly in the movable jaw lever 82. In all other respects the tool unit 16 is substantially identical with the tool unit 14 and operates in a similar manner.

The tool unit 18 (Figure 6) is also similar to the tool units 14 and 16, differing only in the shapes of the fixed and movable jaws 110 and 112, these having round working surfaces 114 and 116 respectively. In the operation of the universal tool 10, let it be assumed that the tool unit 14 is in position in the handle unit 12 (Figure 1), and the operator wishes to cut the end of a wire in the interior of a radio or television set, for example, at an otherwise inaccessible location. Grasping the fixed and movable handle portions 22 and 34 between his fingers and the palm of one hand, but without pushing them toward one another, he inserts the stem 56 into the available space, bringing the open cutting jaws 76 and 96 on opposite sides of the wire end to be cut. The operator then squeezes the handle portions 22 and 34 to move the latter toward the former, swinging the cam arm 36 and its cam edge 38 around the pivot pin 48 and consequently forcing the motion-transmitting rod 64 forward, and accordingly moving the contact ball 70 forward against the cam edge 86 of the jaw arm 84. This action swings the jaw lever 82 counterclockwise around its pivot pin 80 (Figure 1), causing the cutting jaw 96 to move toward the stationary cutting jaw 76 and bringing their cutting edges 98 and 78 into cutting engagement with the opposite sides of the wire or other workpiece to be cut, severing the wire end.

To replace the tool unit 14 with the tool unit 16 or 18, the operator unscrews the coupling collar 46 from the threaded portion 40 of the handle unit 10, withdrawing the tool unit 40 bodily and disconnecting it. He then moves the tool unit 16 or 18 into the same position and screws its coupling collar 46 into position on the threaded coupling portion 40 of the handle unit 12, operatively connecting the tool unit 16 or 18 to the handle unit 12. He then manipulates the tool unit 16 or 18 in the same manner described in connection with the tool unit 14, but uses the flat jaws 100 and 106 or the round jaws 110 and 112 as pliers.

The modified hand tool, generally designated 120, shown in Figure 8 differs from the form of the invention shown in Figures 1 and 2 by providing a bayonet connection, generally designated 122, between the handle unit 121 and the tool unit 123. For this purpose, the hub 125 is provided with a tubular portion 124 having an L-shaped bayonet slot 126 therein and a socket 128. The tool unit 123 has a stem 132 otherwise the same as the stem 56 of the units 14, 16 and 18, except that its lower end portion 134 is of uniform diameter so as to fit into the socket 128 and is drilled transversely to receive a bayonet joint coupling pin 136. Preferably the tubular portion 124 is provided with a pair of the L-shaped bayonet slots 126 disposed at diametrically opposite locations, with the opposite ends of the pin 136 projecting so as to engage the slots 126 simultaneously. The remainder of the modified construction of the universal hand tool 120 is the same as that shown in Figures 1 and 2 and corresponding parts are designated with the same reference numerals.

The operation of the modified hand tool 120 is the same as that of the hand tool 10, except as regards the removal and substitution of the tool units. To remove the tool unit 130 and substitute another for it, the operator merely rotates the stem 132 relatively to the handle unit 121 and then pulls the two apart in order to free the pins 136 from the L-shaped slots 126. The remainder of the operation as regards use of the tool is the same as that described above in connection with Figures 1 to 7 inclusive.

The modified universal hand tool, generally designated 140, shown in Figure 9 is for the most part similar to that shown in Figures 1 to 7 inclusive, and differs only in the construction of the handle unit 142. The tool units 14, 16 and 18 remain identical, together with their coupling arrangement, to the corresponding construction shown in Figures 1 and 2, hence the same reference numerals are used for the corresponding parts and no additional description is believed necessary.

The handle unit 142 consists of a slotted hub 144 having a threaded cylindrical coupling portion 146 similar to the coupling portion 40 of Figure 1 and similarly provided with an enlargement or flange 148. In the hub 144, however, the fixed handle portion 150 is disposed almost perpendicular to the axis of the coupling portion 146 instead of being roughly parallel thereto as is the case with the fixed handle 22 of Figure 1. This provides a so-called pistol grip effect. The movable handle 152, which is pivoted by the pivot pin 154 extending across the slot in the hub 144, has its cam arm 156 located in a similar position to the corresponding portion 34 of Figure 1, together with the cam edge 158 corresponding in location to the cam edge 38 for engagement with the rounded end 66 of the motion-transmitting rod 64. The handle portion 160 of the handle lever 152, however, is hooked back sharply relatively to the cam arm 156 so as to form almost a U-shaped lever instead of a substantially straight lever as in Figure 1, so as to place the handle portion 160 in convenient gripping location relatively to a hand grasping the fixed or stationary handle portion 150. As before, a leaf spring 162 is pinned or otherwise secured as at 164 to the stationary handle portion 150 or to the hub 144, and has a curved free end 166 resiliently engaging the movable handle portion 160 so as to urge it away from the stationary handle portion 150.

It will be evident from Figures 1 and 2 that the tool unit 14 may be rotated relatively to the handle unit 12 so that the jaws 76, 96 or 100, 106 or 110, 112 may be presented to the work in the most advantageous position. Such rotation may be made before using the tool or while it is being used. The same manipulation is also possible with the form shown in Figure 9.

What I claim is:

A hand-operated movable-jaw tool for use in relatively inaccessible locations, comprising a handle portion having a stationary handle and a pivoted movable handle thereon, an elongated support portion connected to said handle portion and extending forwardly therefrom, a pair of work-engaging jaws mounted on said support portion remote from said handle portion, one of said jaws being pivotally mounted on said support portion for motion toward and away from the other jaw, the movable jaw and the movable handle having operating cam elements thereon, and an elongated motion-transmitting device movably mounted on said support portion and operatively interconnecting said cam elements, said portions having bearing elements rotatably engaging one another upon an axis of rotation disposed lengthwise of said elongated support portion, said stationary handle and said movable handle being disposed approximately perpendicular to said support portion.

References Cited in the file of this patent

UNITED STATES PATENTS

| | | |
|---|---|---|
| 160,454 | Miller | Mar. 2, 1875 |
| 852,479 | Weiss | May 7, 1907 |
| 893,602 | Bond | July 21, 1908 |
| 1,224,846 | Brooks | May 1, 1917 |
| 2,518,994 | Miller | Aug. 15, 1950 |
| 2,569,424 | Mayhew et al. | Sept. 25, 1951 |